United States Patent
Qiu et al.

(10) Patent No.: US 11,723,413 B2
(45) Date of Patent: Aug. 15, 2023

(54) CONTROL METHOD AND APPARATUS FOR ELECTRONIC CIGARETTE

(71) Applicant: Changzhou Patent Electronic Technology Co., LTD., Changzhou (CN)

(72) Inventors: Weihua Qiu, Changzhou (CN); Kui Liu, Changzhou (CN)

(73) Assignee: CHANGZHOU PATENT ELECTRONIC TECHNOLOGY CO., LTD., Changzhou (CN)

( * ) Notice: Subject to any disclaimer, the term of this patent is extended or adjusted under 35 U.S.C. 154(b) by 696 days.

(21) Appl. No.: 16/741,709

(22) Filed: Jan. 13, 2020

(65) Prior Publication Data

US 2020/0221783 A1 Jul. 16, 2020

(30) Foreign Application Priority Data

Jan. 12, 2019 (CN) .......................... 201910029134.9

(51) Int. Cl.
| | | |
|---|---|---|
| *A24F 40/53* | (2020.01) | |
| *H04W 4/021* | (2018.01) | |
| *A24F 40/65* | (2020.01) | |
| *A24F 40/50* | (2020.01) | |
| *H04W 4/02* | (2018.01) | |
| *H04W 4/80* | (2018.01) | |
| *H04L 67/12* | (2022.01) | |

(52) U.S. Cl.
CPC .............. *A24F 40/53* (2020.01); *H04W 4/021* (2013.01)

(58) Field of Classification Search
CPC .......... A24F 40/65; A24F 40/50; A24F 40/53; A24F 47/008; A61M 2205/50; A61M 2205/8206; A61M 2205/3584; A61M 2205/3592; H04W 4/02; H04W 4/80; H04W 4/021; H04L 67/12
See application file for complete search history.

(56) References Cited

U.S. PATENT DOCUMENTS

| | | | | |
|---|---|---|---|---|
| 2013/0340775 A1* | 12/2013 | Juster | ...................... | A24F 40/65 131/273 |
| 2015/0181945 A1* | 7/2015 | Tremblay | ................ | A24F 40/60 131/328 |

(Continued)

FOREIGN PATENT DOCUMENTS

CN 107997238 A 5/2018

*Primary Examiner* — Chris Parry
*Assistant Examiner* — Hassan A Khan
(74) *Attorney, Agent, or Firm* — Cheng-Ju Chiang (57) ABSTRACT

A control method and apparatus for an electronic cigarette are disclosed. The method includes: after a terminal establishes a wireless connection with an electronic cigarette bound with the terminal, the terminal detecting whether the terminal or the electronic cigarette enters a non-smoking area; when the terminal detects that the terminal or the electronic cigarette enters a non-smoking area, the terminal sending a smoking banning signal to the electronic cigarette; wherein the smoking banning signal is used to instruct the electronic cigarette, after receiving the smoking banning signal, to stop atomizing in response to the smoking triggering signal, thereby solving the problem that some users use the electronic cigarette in public places to reduce the air quality, and achieving the effect of improving the air quality in public places.

14 Claims, 2 Drawing Sheets

(56) References Cited

U.S. PATENT DOCUMENTS

| | | | |
|---|---|---|---|
| 2016/0081393 A1* | 3/2016 | Black | H04L 67/10 |
| | | | 392/404 |
| 2017/0157343 A1* | 6/2017 | Davidson | A61M 15/06 |
| 2017/0231273 A1* | 8/2017 | Xiang | G07C 9/00182 |
| | | | 340/5.64 |
| 2018/0093054 A1* | 4/2018 | Bowen | A24F 40/60 |
| 2018/0263288 A1* | 9/2018 | Goldstein | A61M 11/042 |
| 2019/0058970 A1* | 2/2019 | Baker | A24F 40/95 |
| 2020/0120992 A1* | 4/2020 | Fang | H04W 4/021 |
| 2020/0237014 A1* | 7/2020 | Lee | A24F 40/40 |
| 2021/0068467 A1* | 3/2021 | Fard | A24F 40/53 |
| 2021/0386126 A1* | 12/2021 | Serita | A24F 40/65 |

\* cited by examiner

CONTROL METHOD AND APPARATUS FOR ELECTRONIC CIGARETTE

TECHNICAL FIELD

The present invention relates to the technical field of computer technology, and in particular, to a control method and a control apparatus for an electronic cigarette.

BACKGROUND

At present, electronic cigarettes, as a substitute of tobacco products, is more and more popular in the market because of its portability and large amount of smoke.

Although the use of electronic cigarettes has reduced the production and the intake of harmful substances, smoking in public places using electronic cigarettes will still cause discomfort to others.

SUMMARY

In order to solve the problem that some users in the prior art use electronic cigarette to reduce air quality in public places, the embodiment of the invention provides a control method and device of electronic cigarette. The technical solution is as follows:

In a first aspect, a control method for an electronic cigarette, the method including:

after a terminal establishes a wireless connection with an electronic cigarette bound with the terminal, the terminal detecting whether the terminal or the electronic cigarette enters a non-smoking area; and when the terminal detects that the terminal or the electronic cigarette enters a non-smoking area, the terminal sending a smoking banning signal to the electronic cigarette;

wherein the smoking banning signal is used to instruct the electronic cigarette, after receiving the smoking banning signal, to stop atomizing in response to the smoking triggering signal.

Optionally, after the terminal sends a smoking banning signal to the electronic cigarette, the method further includes:

when the terminal detects that the terminal or the electronic cigarette leaves the non-smoking area, the terminal sending a ban-lifting signal to the electronic cigarette;

wherein the ban-lifting signal is used to instruct the electronic cigarette to perform atomizing when detecting the smoking triggering signal.

Optionally, the method further includes:

the terminal acquiring the positioning information of the terminal;

when the terminal determines that it is not in a non-smoking area according to the positioning information of the terminal, or when the terminal determines that it enters a smoking area according to the positioning information of the terminal, the terminal determining that it leaves the non-smoking area.

Optionally, the method further includes:

the terminal acquiring the positioning information of the electronic cigarette;

when the terminal determines that the electronic cigarette is not in a non-smoking area according to the positioning information of the electronic cigarette, or when the terminal determines that the electronic cigarette enters a smoking area according to the positioning information of the electronic cigarette, the terminal determining that the electronic cigarette leaves the non-smoking area.

Optionally, the terminal detecting whether the terminal or the electronic cigarette enters a non-smoking area, including:

the terminal acquiring the positioning information of the terminal or the electronic cigarette;

the terminal obtaining the mark for the corresponding location in a map based on the positioning information;

if the mark indicates that the location is a non-smoking area, the terminal determining that the terminal or the electronic cigarette enters a non-smoking area.

Optionally, the terminal detecting whether the terminal enters a non-smoking area, including:

the terminal acquiring the broadcast information broadcast by a wireless access point detected by the terminal;

if the broadcast information includes a non-smoking notice, the terminal determining that the terminal enters a non-smoking area.

Optionally, the method further includes:

the terminal obtaining, according to the positioning information of the terminal or the electronic cigarette, at least one area marked as the area of allowing smoking within a predetermined distance in a map as the recommended smoking area;

the terminal displaying the information of the recommended smoking area.

Optionally, the method further includes:

when the wireless connection between the terminal and the electronic cigarette is disconnected, the terminal displaying a prompt information to prompt the disconnection between the terminal and the electronic cigarette.

In a second aspect, a control method for an electronic cigarette, the method including:

after an electronic cigarette establishes a wireless connection with a terminal bound with the electronic cigarette, the electronic cigarette receiving a smoking banning signal sent from the terminal, wherein the smoking banning signal is sent when the terminal detects that the terminal or the electronic cigarette enters a non-smoking area;

after receiving the smoking banning signal sent from the terminal, the electronic cigarette stopping atomizing in response to the smoking triggering signal.

Optionally, after the electronic cigarette receives the smoking banning signal sent from the terminal, the method further includes:

when the electronic cigarette receives a ban-lifting signal sent from the terminal, the electronic cigarette performing atomizing when it receives the smoking triggering signal, wherein the ban-lifting signal is sent when the terminal detects that the terminal or the electronic cigarette leaves the non-smoking area.

Optionally, the method further includes:

if the electronic cigarette is disconnected from the terminal in the non-smoking area, the electronic cigarette stopping atomizing in response to the smoking triggering signal.

Optionally, the method further includes:

when the electronic cigarette establishes a wireless connection with the terminal, the electronic cigarette updating the remaining puffs to a preset value;

if the puffs sucked reach the preset value after the electronic cigarette is disconnected from the terminal, the electronic cigarette stopping atomizing in response to the smoking triggering signal.

Optionally, the method further includes:

after the electronic cigarette is bound with the terminal, the electronic cigarette sending a rejection notice of binding to other terminal if the electronic cigarette receives a binding request sent from the other terminal, wherein the rejection notice of binding includes an identification of the electronic cigarette;

when the other terminal receives the rejection notice of binding, the other terminal being triggered to upload an alarm notification information including the identification of the electronic cigarette to a server, wherein the alarm notification information further includes the positioning information of the other terminal or the IP information used by the other terminal.

In a third aspect, a computer-readable storage medium having stored therein one or more instructions, wherein the one or more instructions are executed by a processor in a terminal to realize the control method mentioned in the above first aspect, or the one or more instructions are executed by a processor in an electronic cigarette to realize the control method mentioned in the above second aspect.

In a fourth aspect, a control apparatus for an electronic cigarette, the control apparatus including:

a memory having stored therein at least one program instruction; and a processor configured for loading and executing the at least one program instruction to realize the control method mentioned in the above first aspect, or configured for loading and executing the at least one program instruction to realize the control method mentioned in the above second aspect.

The beneficial effects brought by the technical solutions provided by the embodiments of the present invention are:

The method provided in the embodiment of the present invention detects whether the terminal or the electronic cigarette enters a non-smoking area by establishing a wireless connection between the terminal and the electronic cigarette bound with the terminal. When the terminal or the electronic cigarette is detected to enter a non-smoking area, the terminal sends a smoking banning signal to the electronic cigarette, wherein the smoking banning signal is used to instruct the electronic cigarette, after receiving the smoking banning signal, to stop atomizing in response to the smoking triggering signal, thereby solving the problem that some users use the electronic cigarette in public places to reduce the air quality, and achieving the effect of improving the air quality in public places.

BRIEF DESCRIPTION OF THE DRAWINGS

In order to more clearly illustrate the technical solutions in the embodiments of the present invention, the drawings used in the description of the embodiments will be briefly described below. It is obvious that the drawings in the following description are only some embodiments of the present invention. For those of ordinary skill in the art, other drawings may also be obtained in light of these drawings without any creative efforts.

DETAILED DESCRIPTION OF PREFERRED EMBODIMENTS

In order to make the objects, the technical solution and the advantages of the present invention much clear, the embodiments of the present invention will be further described in detail below with reference to the accompanying drawings. The "terminal" mentioned in this description may include smart phones, tablet computers, laptop computers, intelligent wearable devices and so on.

Figure 1:
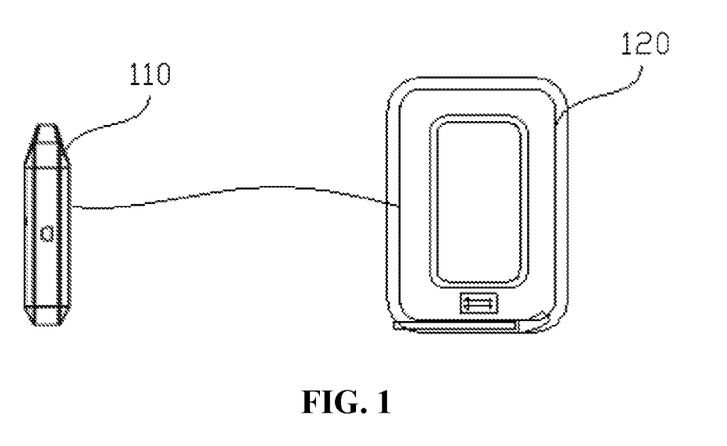
FIG. 1 is a schematic diagram of an implementation environment provided in an exemplary embodiment of the present invention.

FIG. 1 is a schematic diagram of an implementation environment provided in an exemplary embodiment of the present invention. The implementation environment includes an electronic cigarette 110 and a terminal 120.

The electronic cigarette 110 can establish a binding relationship with the terminal 120, and an application (APP) for managing the electronic cigarette 110 is installed in the terminal 120.

Specifically, the electronic cigarette 110 is bound to the terminal identification of the terminal 120, or the electronic cigarette 110 is bound to the user account registered in the application of the terminal 120. For example, in binding the electronic cigarette 110 with the terminal 120, the electronic cigarette 110 can store the terminal identification of the terminal 120 to be bound in the electronic cigarette 110, and the terminal 120 uploads its terminal identification and the identification of the electronic cigarette 110 to a server for storage. For another example, in binding the electronic cigarette 110 with the terminal 120, the electronic cigarette 110 can store the user account bound to it in the electronic cigarette 110, and the terminal 120 uploads the user account and the identification of the electronic cigarette 110 to a server for storage.

The terminal 120 and the electronic cigarette 110 can establish a wireless connection through wireless communication technology, wherein the wireless communication technology mentioned here includes but is not limited to Bluetooth, infrared, cellular network, wireless fidelity (WiFi), ZigBee, near field communication (NFC), etc.

Figure 2:
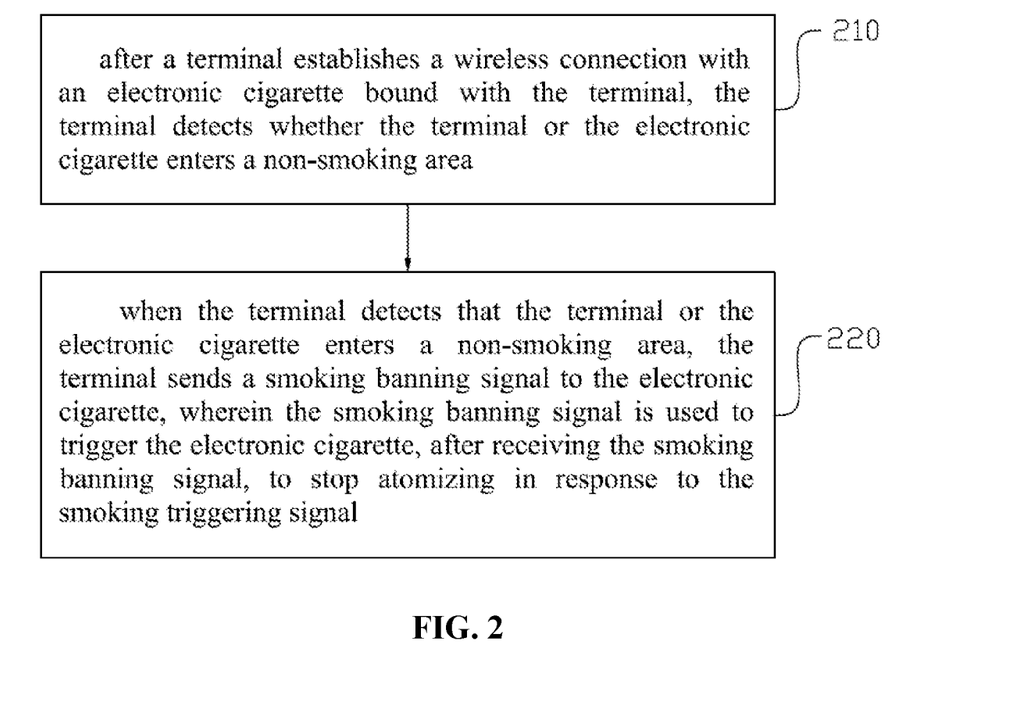
FIG. 2 is a flow chart of a control method for an electronic cigarette provided in one embodiment of the present invention.

Referring to FIG. 2, a flow chart of a control method for the electronic cigarette is provided in one embodiment of the present invention. In this embodiment, the control method is illustrated as being applied in the terminal 120 shown in FIG. 1. Referring to FIG. 2, the control method for the electronic cigarette may include:

Step 210: after the terminal 120 establishes a wireless connection with the electronic cigarette 110 bound with the terminal 120, the terminal 120 detecting whether the terminal 120 or the electronic cigarette 110 enters a non-smoking area.

Specifically, detecting whether the terminal 120 enters a non-smoking area can be realized in the following ways:

First, when the terminal 120 detects a wireless access point, the terminal 120 acquires the broadcast information broadcast by the wireless access point; the terminal 120 determines whether the broadcast information includes a non-smoking notice; if the broadcast information includes a non-smoking notice, the terminal 120 determines that it enters a non-smoking area.

The broadcast information broadcast by the wireless access point can be set by the management personnel of the place where the wireless access point is located.

In one example, the wireless access point in this embodiment can periodically broadcast the broadcast information, and the terminal 120 receives the broadcast information broadcast by the wireless access point. In another example, when the wireless access point in this embodiment detects the access of the terminal 120, that is, when the terminal 120 is connected with the wireless access point, the wireless access point transmits the broadcast information to the terminal 120.

Optionally, determining whether the broadcast information includes a non-smoking notice can be realized in the following ways: the terminal 120 detects whether the broadcast information includes the text "no smoking" or the words "no smoking"; if the broadcast information includes the text "no smoking" or the words "no smoking", then the terminal 120 determines that it enters a non-smoking area.

In the actual implementation, the terminal 120 can perform intelligent semantic analysis on the broadcast information, so as to determine whether the broadcast information includes a non-smoking notice; the terminal 120 can also detect whether the broadcast information includes a sign used to indicate non-smoking, wherein the sign amounts to a non-smoking notice.

Second, the positioning information of the terminal 120 can be acquired using the positioning technology or obtained from the user by input; the terminal 120 obtains the mark for the corresponding location in a map based on the positioning information of the terminal 120; if the mark indicates that the location is a non-smoking area, the terminal 120 determines that it enters a non-smoking area.

The map can be a map stored in the electronic cigarette, a map around the terminal 120 obtained by the terminal 120 from the server according to the positioning information, or a map stored in the terminal 120. The map mentioned here may include the coordinate information and the location description information of multiple locations. The map may also include at least one of the location marks, paths, road signs and real-time traffic information of multiple roads. The location description information mentioned here may include the name of the location, the purpose of the location, etc.

Optionally, the terminal 120 may send a first query request with the positioning information of the terminal 120 to the server; the server determines, according to the first query request, the mark for the corresponding location in the map based on the positioning information of the terminal 120; and sends the mark to the terminal 120.

Optionally, the mark for the corresponding location in the map can be set by the developer. For example, the developer can determine whether smoking banning is needed based on the location description information of the location; if smoking banning is needed, the location can be added with a non-smoking mark. For example, the developer can mark public places such as schools, hospitals, stations, airports and so on as non-smoking areas.

In one example, if the developer determines smoking is allowed in the location based on the location description information of the location, the location can be marked as a smoking area, then when the terminal 120 indicates that smoking is allowed according to the mark for the corresponding location in the map based on the positioning information of the terminal 120, the terminal 120 determines that it enters the smoking area.

In another example, if the developer does not mark the location in the map as a smoking area, then when the terminal 120 does not indicate that smoking is banned according to the mark for the corresponding location in the map based on the positioning information of the terminal 120, the terminal 120 determines that it enters the smoking area.

Specifically, detecting whether the electronic cigarette 110 enters a non-smoking area can be realized in the following ways: the terminal 120 acquires the positioning information of the electronic cigarette 110, wherein the positioning information of the electronic cigarette 110 is obtained by the electronic cigarette 110 using the positioning technology; the terminal 120 obtains the mark for the corresponding location in the map based on the positioning information of the electronic cigarette 110; if the mark indicates that the location is a non-smoking area, the terminal 120 determines that the electronic cigarette 110 enters a non-smoking area. The way of obtaining the mark for the corresponding location in the map based on the positioning information of the electronic cigarette 110 can be realized with reference to the way of obtaining the mark for the corresponding location in the map based on the positioning information of the terminal 120, and the description is omitted herein for clarity.

Step 220: when the terminal 120 detects that the terminal 120 or the electronic cigarette 110 enters a non-smoking area, the terminal 120 sending a smoking banning signal to the electronic cigarette 110, wherein the smoking banning signal is used to instruct the electronic cigarette 110, after receiving the smoking banning signal, to stop atomizing in response to the smoking triggering signal.

Optionally, after the electronic cigarette 110 is banned from smoking, the ban can be removed in the following ways:

First, the duration of banning the electronic cigarette 110 from smoking is counted; when the duration reaches a preset duration, atomizing will be performed when the smoking triggering signal is detected.

The preset duration can be set by the system developer or customized by the user.

For example, when the user of the terminal 120 carries the electronic cigarette 110 into a hospital, the terminal 120 detects that it enters a non-smoking area, the terminal 120 sends a smoking banning signal to the electronic cigarette 110 to ban the electronic cigarette 110. When the duration of banning the electronic cigarette 110 from smoking is up to 1 hour, the ban to the electronic cigarette 110 will be removed automatically. If the terminal 120 still detects that the electronic cigarette 110 or the terminal 120 enters a non-smoking area, the terminal 120 will send the smoking banning signal to the electronic cigarette 110 again to ban the electronic cigarette 110, that is, the electronic cigarette 110 will stop atomizing in response to the smoking triggering signal.

Second, the terminal 120 detects whether the terminal 120 or the electronic cigarette 110 leaves the non-smoking area; when detecting that the terminal 120 or the electronic cigarette 110 leaves the non-smoking area, the terminal 120 sends a ban-lifting signal to the electronic cigarette 110. The ban-lifting signal is used to instruct the electronic cigarette 110 to perform atomizing when detecting the smoking triggering signal.

Specifically, detecting whether the terminal 120 leaves the non-smoking area can be realized in the following ways:

First, if the terminal 120 determines that it enters the non-smoking area through the broadcast information broadcast by the wireless access point, then when the terminal 120 cannot detect the wireless access point, the terminal 120 determines that it leaves the non-smoking area.

Optionally, if the terminal 120 is connected with the wireless access point, the terminal 120 determines that it leaves the non-smoking area when the terminal 120 is disconnected from the wireless access point.

Second, if the terminal 120 determines that it enters the non-smoking area through positioning technology, then when the broadcast information broadcast by a wireless access point connected with the terminal 120 includes a smoking allowing notice, the terminal 120 determines that it leaves the non-smoking area.

For example, when the user of the terminal 120 carries the electronic cigarette 110 into a hospital, the terminal 120 detects that it enters a non-smoking area, the terminal 120 sends a smoking banning signal to the electronic cigarette 110 to ban the electronic cigarette 110, that is, to stop atomizing in response to the smoking triggering signal. However, there is generally a special smoking room (i.e., smoking area) in the hospital, the smoking room is provided with a wireless access point, the broadcast information broadcast by the wireless access point will include a smoking allowing notice, and the terminal 120 sends a ban-lifting signal to the electronic cigarette 110 according to the smoking allowing notice.

Optionally, in this embodiment, determining whether the broadcast information broadcast by the wireless access point includes a smoking allowing notice can be realized with reference to determining whether the broadcast information broadcast by the wireless access point includes a non-smoking notice, and the description is omitted herein for clarity.

Third, the terminal 120 can acquire the positioning information of the terminal 120; when the terminal 120 determines that it is not in a non-smoking area according to the positioning information of the terminal 120, or when the terminal 120 determines that it enters a smoking area (e.g., the area not marked as non-smoking area in the map, or the area marked as smoking area in the map) according to the positioning information of the terminal 120, the terminal 120 determines that it leaves the non-smoking area.

Optionally, the terminal 120 can acquire the positioning information of the electronic cigarette 110; when the terminal 120 determines that the electronic cigarette 110 is not in a non-smoking area according to the positioning information of the electronic cigarette 110, or when the terminal 120 determines that the electronic cigarette 110 enters a smoking area according to the positioning information of the electronic cigarette 110, the terminal 120 determines that the electronic cigarette 110 leaves the non-smoking area.

In summary, the method provided in the embodiment of the present invention detects whether the terminal 120 or the electronic cigarette 110 enters a non-smoking area by establishing a wireless connection between the terminal 120 and the electronic cigarette 110 bound with the terminal 120. When the terminal 120 or the electronic cigarette 110 is detected to enter a non-smoking area, the terminal 120 sends a smoking banning signal to the electronic cigarette 110, wherein the smoking banning signal is used to instruct the electronic cigarette 110, after receiving the smoking banning signal, to stop atomizing in response to the smoking triggering signal, thereby solving the problem that some users use the electronic cigarette 110 in public places to reduce the air quality, and achieving the effect of improving the air quality in public places.

Optionally, in order to meet the smoking demand of the user of the electronic cigarette 110, the terminal 120 can also provide the location of the smoking areas for the user's reference, which can be realized in the following ways:

After the terminal 120 sends the smoking banning signal to the electronic cigarette 110, or when the terminal 120 receives a second query request sent by the electronic cigarette 110, at least one area marked as the area of allowing smoking within a predetermined distance is obtained according to the positioning information of the terminal 120 or the electronic cigarette 110 in the map as the recommended smoking area, the terminal 120 then displays the information of the recommended smoking area.

The second query request can be sent to the terminal 120 by the electronic cigarette 110 when the banned electronic cigarette 110 detects the smoking triggering signal. The information of the recommended smoking area can include at least one of the name, the distance and the location of the recommended smoking area in the map.

Optionally, the terminal 120 can also provide a query option for the smoking areas; when the terminal 120 detects that the query option is selected, at least one area marked as the area of allowing smoking within a predetermined distance is obtained according to the positioning information of the terminal 120 or the electronic cigarette 110 in the map as the recommended smoking area, the terminal 120 then displays the information of the recommended smoking area.

Optionally, the terminal 120 can also obtain the selected smoking area from the recommended smoking areas, and then the terminal 120 displays or navigates the route to the selected smoking area.

In the embedment of the present invention, the banned electronic cigarette 110 will stop atomizing in response to the smoking triggering signal. That is, even if the user of the electronic cigarette 110 presses the button of the electronic cigarette 110 to smoke using the electronic cigarette 110, the electronic cigarette 110 does not perform atomizing, so as to prevent the user of the electronic cigarette 110 from smoking.

In order to avoid the illegal use (e.g., the stealing use) of the electronic cigarette 100, in one example, when the unbanned electronic cigarette 110 establishes a wireless connection with the terminal 120 bound with the electronic cigarette 110, the electronic cigarette 110 performs atomizing in response to the smoking triggering signal. When no wireless connection is established between the unbanned electronic cigarette 110 and the terminal 120 bound with the electronic cigarette 110, the electronic cigarette 110 stops atomizing in response to the smoking triggering signal.

Optionally, if the electronic cigarette 110 is disconnected from the terminal 120 in the non-smoking area, the electronic cigarette 110 stops atomizing in response to the smoking triggering signal. The realization can be as follows: if the electronic cigarette 110 is disconnected from the terminal 120 after the electronic cigarette 110 receives the smoking banning signal, the electronic cigarette 110 keeps stopping atomizing in response to the smoking triggering signal.

In another example, when the electronic cigarette 110 establishes a wireless connection with the terminal 120 bound with the electronic cigarette 110, the remaining puffs of the electronic cigarette 110 are updated to a preset value, and the electronic cigarette 110 performs atomizing in response to the smoking triggering signal. The unbanned electronic cigarette 110 counts the puffs after it is disconnected from the terminal 120; if the puffs sucked reach the preset value, then the electronic cigarette 110 will stop atomizing in response to the smoking triggering signal.

Optionally, the electronic cigarette 110 updates and displays the remaining puffs of the electronic cigarette 110 according to the puffs. For example, for each increase of puffs detected by the electronic cigarette 110, the remaining puffs of the electronic cigarette 110 will be reduced by one.

The preset value can be set by the developer or customized by the user.

Taking that the preset value is 10 as an example, when the unbanned electronic cigarette 110 establishes a wireless connection with the terminal 120 bound with the electronic cigarette 110, the remaining puffs in the electronic cigarette 110 is kept at 10 no matter how many puffs the user sucks using the electronic cigarette 110. After the unbanned electronic cigarette 110 is disconnected from the terminal 120, the remaining puffs will be reduced by one when the user of the electronic cigarette 110 sucks each puff. When the remaining puffs reach zero, the electronic cigarette 110 will no longer atomize in response to the smoking triggering signal. If the user of the electronic cigarette 110 wants to use the electronic cigarette 110 to continue to smoke, it is needed to establish a wireless connection between the electronic cigarette 110 and the terminal 120 again. After the wireless connection is established, the remaining puffs will restore to the preset value, and the electronic cigarette 110 atomizes in response to the smoking triggering signal.

Optionally, in order to avoid loss of the electronic cigarette 110, when the wireless connection between the electronic cigarette 110 and the terminal 120 bound with the electronic cigarette 110 is disconnected, the terminal 120 displays a prompt information to prompt the disconnection between the terminal 120 and the electronic cigarette 110, to avoid the loss of the electronic cigarette 110, and/or, the electronic cigarette 110 displays a prompt information to prompt the disconnection between the terminal 120 and the electronic cigarette 110, to avoid the loss of the terminal 120. The prompt information can be displayed in the manner of at least one of text, voice, vibration, indicator light, etc., which is not specifically limited in this embodiment.

Optionally, the electronic cigarette 110 can be bound only with one terminal 120, and the realization can be as follows: after the electronic cigarette 110 is bound with the terminal 120, the electronic cigarette 110 sends a rejection notice of binding to other terminal if the electronic cigarette 110 receives a binding request sent from the other terminal.

Optionally, when the electronic cigarette 110 establishes a wireless connection with the other terminals, data can be transmitted between the electronic cigarette 110 and the other terminals, such as suction data, which may specifically include the puffs, the nicotine concentration, the nicotine intake, the working power/temperature, etc. However, the electronic cigarette 110 does not respond to the smoking banning signal and the ban-lifting signal sent from the other terminals.

For example, after an electronic cigarette A establishes a binding relationship with a terminal B, the electronic cigarette A cannot establish a binding relationship with other terminals such as a terminal C. However, the electronic cigarette A can still establish a wireless connection with the other terminals for data transmission, but the electronic cigarette A cannot be sucked or the number of puffs is limited.

If the electronic cigarette 110 is tried to be bound with the other terminals, then the electronic cigarette 110 may have be illegally stolen or accidently picked up by the users of the other terminals trying to bind with the electronic cigarette 110, and the binding operation is likely not the behavior of the owner of the electronic cigarette 110. In order to cause the owner of the electronic cigarette 110 to obtain the location of the electronic cigarette 110, optionally, when the other terminal receives the rejection notice of binding, the other terminal is triggered to upload an alarm notification information including the identification of the electronic cigarette 110 to the server. The rejection notice of binding includes the identification of the electronic cigarette 110, and the alarm notification information further includes the positioning information of the other terminal or the IP information used by the other terminal. The owner of the electronic cigarette 110 can obtain the location of the electronic cigarette 110 from the server through the user account or the terminal identification of the terminal 120 in combination with the identification of the electronic cigarette 110.

After receiving the alarm notification information, the server queries the terminal 120 or the user account bound with the electronic cigarette 110 according to the identification of the electronic cigarette 110. If the terminal 120 bound with the electronic cigarette 110 is found, the alarm notification information is sent to the terminal 120 bound to the electronic cigarette 110 in the form of SMS notification, telephone notification, notification through the application (APP) installed on the terminal 120, etc. If the user account bound with the electronic cigarette 110 is found, the alarm notification information will be sent to the terminal 120 logging in with the user account.

Optionally, the application (APP) installed on the terminal 120 also has the option to close the smoking banning function of the electronic cigarette 110. When the terminal 120 detects that the smoking banning function is opened, it sends an opening signal to the electronic cigarette 110 to open the smoking banning function. According to the opening signal, the electronic cigarette 110 opens the smoking banning function, such that the terminal 120 can execute the steps shown in FIG. 2, and the electronic cigarette 110 with the smoking banning function being opened can execute the steps shown in FIG. 3, that is, smoking is banned according to the smoking banning signal, i.e., atomizing is stopped in response to the smoking triggering signal.

Figure 3:
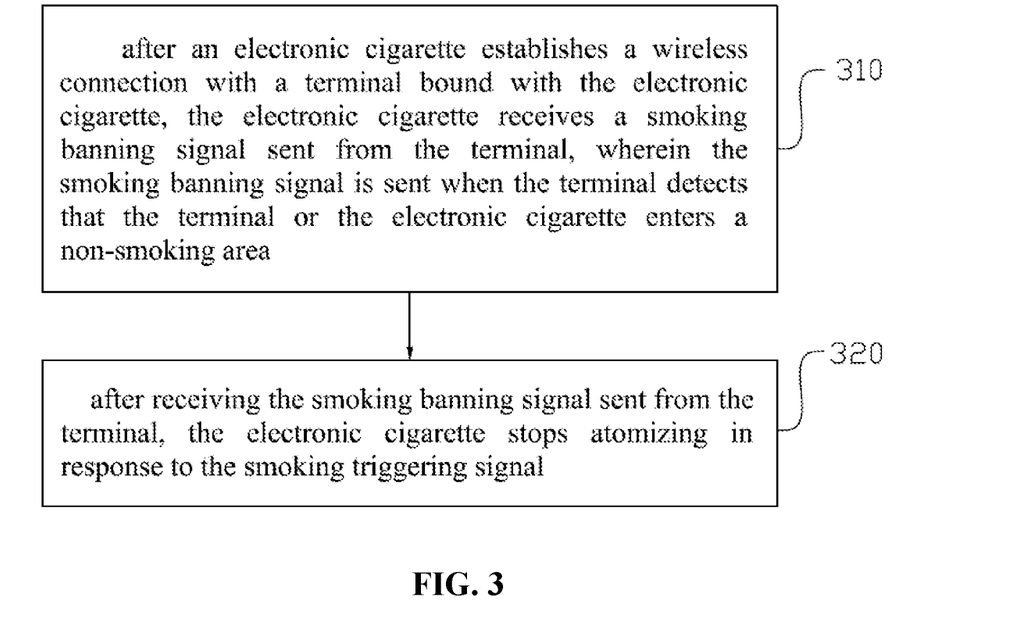
FIG. 3 is a flow chart of a control method for an electronic cigarette provided in another embodiment of the present invention.

Further, when the terminal 120 detects that the smoking banning function is closed, it sends a closing signal to the electronic cigarette 110 for closing the smoking banning function. According to the closing signal, the electronic cigarette 110 closes the smoking banning function, and the electronic cigarette 110 with the smoking banning function being closed can perform atomizing when detecting the smoking triggering signal.

Referring to FIG. 3, a flow chart of a control method for the electronic cigarette is provided in another embodiment of the present invention. In this embodiment, the control method is illustrated as being applied in the electronic cigarette 110 shown in FIG. 1. Referring to FIG. 3, the control method for the electronic cigarette may include:

Step 310: after the electronic cigarette 110 establishes a wireless connection with the terminal 120 bound with the electronic cigarette 110, the electronic cigarette 110 receiving a smoking banning signal sent from the terminal 120, wherein the smoking banning signal is sent when the terminal 120 detects that the terminal 120 or the electronic cigarette 110 enters a non-smoking area.

Step 320: after receiving the smoking banning signal sent from the terminal 120, the electronic cigarette 110 stopping atomizing in response to the smoking triggering signal.

Optionally, the electronic cigarette 110 will enter a smoking banning mode according to the smoking banning signal, and the electronic cigarette 110 in the smoking banning mode will stop atomizing in response to the smoking triggering signal. Optionally, the electronic cigarette 110 will exit the smoking banning mode according to a ban-lifting signal, and the electronic cigarette 110 not in the smoking banning mode will perform atomizing when detecting the smoking triggering signal.

In one example, after step 320, when the electronic cigarette 110 receives a ban-lifting signal sent from the terminal 120, the electronic cigarette 110 will perform atomizing when it receives the smoking triggering signal.

The ban-lifting signal is sent when the terminal 120 detects that the terminal 120 or the electronic cigarette 110 leaves the non-smoking area.

In another example, the duration of banning the electronic cigarette 110 from smoking is counted; if the duration reaches the preset duration, the smoking banning is removed, that is, atomizing is performed when the electronic cigarette 110 detects the smoking triggering signal. The preset duration can be set by the system developer or customized by the user.

The realization of counting the duration of banning the electronic cigarette 110 from smoking can be as follows: when receiving the smoking banning signal sent by the terminal 120, the electronic cigarette 110 starts timing to get the duration of banning the electronic cigarette 110 from smoking.

Optionally, the electronic cigarette 110 includes an atomizer, a control circuit, a load circuit and a wireless communication module, wherein the atomizer is connected with the load circuit, the load circuit is connected with the positive pole of a battery module, the load circuit is provided with a switch, the control end of the switch is electrically connected with the output end of a processor in the control circuit, and the wireless communication module is connected with the processor.

When the electronic cigarette 110 controls the atomizer to work, the processor controls the switch to turn on so that the battery module supplies power to the atomizer through the load circuit. The processor also controls the switch to turn off so that the battery module stops providing power to the atomizer.

The processor can establish a wireless connection and communicate with the terminal 120 through the wireless communication module. The wireless connection mentioned here can be any of Bluetooth connection, NFC (near field communication) connection, infrared connection, etc.

Optionally, the electronic cigarette 110 is provided with a button electrically connected with the processor. When the processor detects that the button is operated, the signal generated by operating the button is the smoking triggering signal.

Optionally, the electronic cigarette 110 is also provided with a sensor assembly for detecting the airflow to generate an airflow signal, and the airflow signal generated by the sensor assembly is the smoking triggering signal. The sensor assembly includes a sensor for detecting the airflow, such as air pressure sensor, airflow sensor, pressure sensor, etc., and the sensor assembly is electrically connected with the processor in the electronic cigarette 110.

Optionally, an airflow passage where the sensor assembly is located is connected with a mouthpiece of the electronic cigarette 110. When the user sucks using the mouthpiece of the electronic cigarette 110, because the sensor assembly is arranged in the airflow passage communicated with the mouthpiece, the sensor assembly can detect the change of the airflow in the airflow passage, such as the change of air pressure, airflow velocity, etc.

Optionally, the atomizer includes a liquid storage chamber for storing the cigarette liquid and an atomizing assembly for heating the cigarette liquid to atomize. The battery module is electrically connected with the atomizing assembly through the load circuit. Optionally, the upper end of the electronic cigarette 100 is provided with the mouthpiece, the mouthpiece is communicated with an atomizing chamber of the atomizer, and the user of the electronic cigarette 100 can suck using the mouthpiece.

In the method provided in the embodiment of the present invention, the electronic cigarette establishes a wireless connection with the terminal bound with the electronic cigarette, the electronic cigarette receives the smoking banning signal sent from the terminal when the terminal detects that the terminal or the electronic cigarette enters a non-smoking area, so that the electronic cigarette stops atomizing in response to the smoking triggering signal, thereby solving the problem in the related art that some users use the electronic cigarette in public places to reduce the air quality, and achieving the effect of improving the air quality in public places.

An embodiment of the present invention also provides a computer-readable storage medium, and the computer-readable storage medium has stored therein one or more instructions. When the one or more instructions are executed by the processor in the electronic cigarette or in the terminal, the control method of the electronic cigarette in any of the above embodiments is realized.

An embodiment of the present invention also provides a control apparatus of the electronic cigarette, the control apparatus includes a memory and a processor; at least one program instruction is stored in the memory; by loading and executing the at least one program instruction, the processor realizes the control method of the electronic cigarette in any of the above embodiments.

The terms "first" and "second" are used for descriptive purposes only and cannot be understood as indicating or implying relative importance or the number of technical features indicated. Thus, the defined "first" and "second" features may explicitly or implicitly include one or more such features. In the description of the present invention, unless otherwise stated, "multiple" means two or more.

A person skilled in the art can understand that all or part of the steps to realize the above embodiments can be completed by hardware, and can also be completed by programs to instruct related hardware. The programs can be stored in a computer-readable storage medium, which can be read-only memory, magnetic disk or optical disk, etc.

The above are only the preferred embodiments of the present invention, and are not intended to limit the present invention. Any modifications, equivalents, improvements, etc., which are within the scope of the present invention, should be included in the protection scope of the present invention.

What is claimed is:

1. A control method for an electronic cigarette, the method comprising:
   a terminal establishing a wireless connection with an electronic cigarette bound with the terminal;
   the terminal detecting whether the terminal or the electronic cigarette enters a non-smoking area;
   when the terminal detects that the terminal or the electronic cigarette enters a non-smoking area, the terminal sending a smoking banning signal to the electronic cigarette, wherein the smoking banning signal is used to instruct the electronic cigarette, after receiving the smoking banning signal, to stop atomizing in response to a smoking triggering signal;
   wherein the method further comprises:
   after the terminal sends the smoking banning signal to the electronic cigarette, the terminal receiving a query request sent from the electronic cigarette, wherein the query request is sent to the terminal by the electronic cigarette when the banned electronic cigarette detects a smoking triggering signal;

in response to the query request, the terminal obtaining, according to the positioning information of the terminal or the electronic cigarette, at least one area of allowing smoking within a predetermined distance as the recommended smoking area;
the terminal displaying the information of the recommended smoking area.

2. The method of claim 1, wherein after the terminal sends the smoking banning signal to the electronic cigarette, the method further comprises:
the terminal detecting whether the terminal or the electronic cigarette leaves the non-smoking area;
when the terminal detects that the terminal or the electronic cigarette leaves the non-smoking area, the terminal sending a ban-lifting signal to the electronic cigarette, wherein the ban-lifting signal is used to instruct the electronic cigarette, after receiving the ban-lifting signal, to perform atomizing in response to a smoking triggering signal.

3. The method of claim 2, wherein the method further comprises:
the terminal acquiring the positioning information of the terminal;
when the terminal determines that it is not in a non-smoking area according to the positioning information of the terminal, or when the terminal determines that it enters a smoking area according to the positioning information of the terminal, the terminal determining that it leaves the non-smoking area.

4. The method of claim 2, wherein the method further comprises:
the terminal acquiring the positioning information of the electronic cigarette;
when the terminal determines that the electronic cigarette is not in a non-smoking area according to the positioning information of the electronic cigarette, or when the terminal determines that the electronic cigarette enters a smoking area according to the positioning information of the electronic cigarette, the terminal determining that the electronic cigarette leaves the non-smoking area.

5. The method of claim 1, wherein the terminal detecting whether the terminal or the electronic cigarette enters a non-smoking area, comprising:
the terminal acquiring the positioning information of the terminal or the electronic cigarette;
the terminal obtaining the mark for the corresponding location in a map based on the positioning information;
if the mark indicates that the location is a non-smoking area, the terminal determining that the terminal or the electronic cigarette enters a non-smoking area.

6. The method of claim 1, wherein the terminal detecting whether the terminal enters a non-smoking area, comprising:
the terminal acquiring the broadcast information broadcast by a wireless access point detected by the terminal;
if the broadcast information includes a non-smoking notice, the terminal determining that the terminal enters a non-smoking area.

7. The method of claim 1, wherein the method further comprises:
when the wireless connection between the terminal and the electronic cigarette is disconnected, the terminal displaying a prompt information to prompt the disconnection between the terminal and the electronic cigarette.

8. A control method for an electronic cigarette, the method comprising:
the electronic cigarette establishing a wireless connection with a terminal bound with the electronic cigarette;
the electronic cigarette receiving a smoking banning signal sent from the terminal, wherein the smoking banning signal is sent when the terminal detects that the terminal or the electronic cigarette enters a non-smoking area;
after receiving the smoking banning signal sent from the terminal, the electronic cigarette stopping atomizing in response to a smoking triggering signal;
wherein the method further comprises:
after receiving the smoking banning signal sent from the terminal, the electronic cigarette sending a query request to the terminal when the banned electronic cigarette detects a smoking triggering signal, such that in response to the query request, the terminal obtains, according to the positioning information of the terminal or the electronic cigarette, at least one area of allowing smoking within a predetermined distance as the recommended smoking area, and the terminal displays the information of the recommended smoking area.

9. The method of claim 8, wherein after the electronic cigarette receives the smoking banning signal sent from the terminal, the method further comprises:
the electronic cigarette receiving a ban-lifting signal sent from the terminal, wherein the ban-lifting signal is sent when the terminal detects that the terminal or the electronic cigarette leaves the non-smoking area;
after receiving the ban-lifting signal sent from the terminal, the electronic cigarette performing atomizing in response to a smoking triggering signal.

10. The method of claim 8, wherein the method further comprises:
if the electronic cigarette is disconnected from the terminal in the non-smoking area, the electronic cigarette stopping atomizing in response to a smoking triggering signal.

11. The method of claim 8, wherein the method further comprises:
after the electronic cigarette is bound with the terminal, the electronic cigarette sending a rejection notice of binding to other terminal if the electronic cigarette receives a binding request sent from the other terminal, wherein the rejection notice of binding includes an identification of the electronic cigarette;
when the other terminal receives the rejection notice of binding, the other terminal being triggered to upload an alarm notification information including the identification of the electronic cigarette to a server, wherein the alarm notification information further comprises the positioning information of the other terminal or the IP information used by the other terminal.

12. The method of claim 8, wherein the method further comprises:
when the electronic cigarette establishes a wireless connection with the terminal each time, the electronic cigarette updating the remaining puffs to a preset value;
after the electronic cigarette is disconnected from the terminal, the electronic cigarette counting the puffs being sucked;
if the puffs being sucked reach the preset value after the electronic cigarette is disconnected from the terminal, the electronic cigarette stopping atomizing in response to a smoking triggering signal.

13. A control apparatus for an electronic cigarette, the control apparatus comprising:

a memory having stored therein at least one program instruction; and a processor configured for loading and executing the at least one program instruction to realize the control method of claim 1.

14. A control apparatus for an electronic cigarette, the control apparatus comprising:

a memory having stored therein at least one program instruction; and a processor configured for loading and executing the at least one program instruction to realize the control method of claim 8.

* * * * *